Patented Aug. 7, 1934

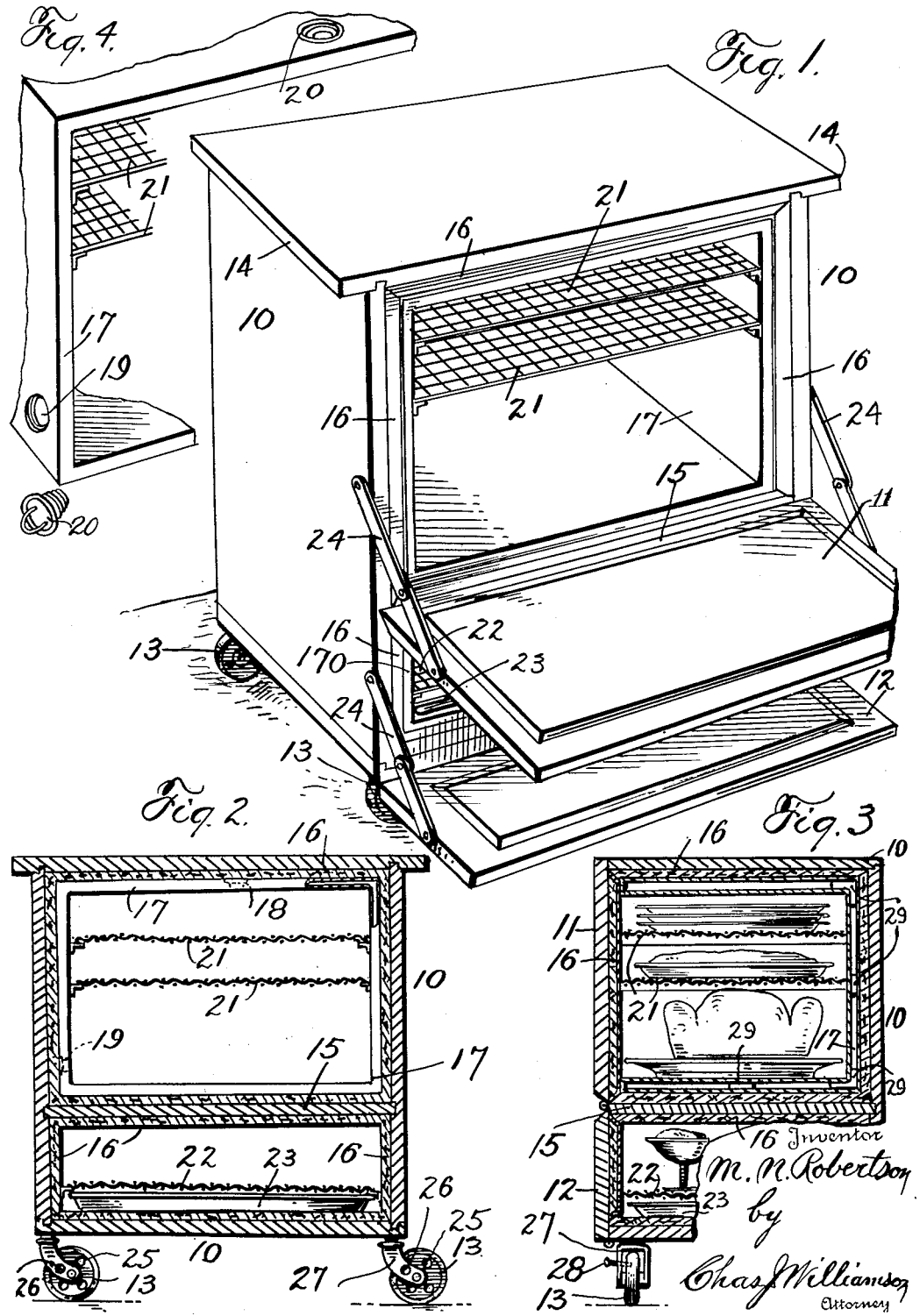

1,969,580

UNITED STATES PATENT OFFICE 1,969,580

FOOD SERVER

Mabel Nixon Robertson, Philadelphia, Pa.

Application December 31, 1932, Serial No. 649,721

1 Claim. (Cl. 312—146).

An object of my invention is to provide a perambulating, or portable stand, or cabinet, with compartments for holding the variety of cooked or prepared food articles for a meal, into which they may be placed with the cabinet in the kitchen or place of cooking or preparation, and then transferred to the dining room, or eating place, and served at the table in courses, or as needed in the desirable heated or cold condition given them at the time of preparation, so that a waitress or other special help for service at the table may be dispensed with, or is unnecessary, and yet service at the table be had to exacting or fastidious persons, and so that the food at the time of service will be in a wholly acceptable condition. The problem presented for solution in such an article, or contrivance, includes the matter of maintenance of foods to be served under extremes of temperature, some foods being required to be hot and others cold at the time of eating, the maximum of food space or chamber with the minimum of bulk of the cabinet, having reference to the limited space, or room, afforded by modern apartments, and to the placing of the filled cabinet for convenient access at the dining table and the avoidance of an unsightly appearance at or about the dining table.

In what I now consider the best embodiment of my invention, it is a cabinet that accomplishes the object or purpose just named. My invention, however, consists in whatever is described by or is included within the terms or scope of the appended claim.

In the drawing:

Fig. 1 is a perspective view of a food-serving cabinet embodying my invention, the two doors with which it is provided being shown in an open shelf-forming position;

Fig. 2 is a vertical section from side to side;

Fig. 3 is a similar section from front to back;

Fig. 4 is a detail view in perspective of a fragment of the hollow wall for hot water, of the chamber designed for articles of food that must be kept properly heated at the time of service and eating.

Describing in detail the cabinet shown in the drawing, it comprises a box-like external casing 10, with rectangular end walls, top, bottom and back walls, open at the front, which is provided with two doors 11 and 12, one above the other, hinged to swing from a vertical closing position to a horizontal position, and there supported as shown in Fig. 1. The casing walls may be of wood or other material and given a surface treatment by paint or otherwise which will make the cabinet, externally, an attractive article of furniture, notwithstanding its high practical utility. The cabinet is mounted on four swiveled rollers, or casters 13, one at each of the four corners at the bottom so that it may be readily trundled from room to room and moved about therein, and its height is preferably such that it may be readily pushed beneath the dining table out of the way and out of sight and yet at hand for convenient service of food by the hostess or head of the table. And to facilitate shifting or trundling it about, the top at each end is projected to form a flange 14, of dimensions and form readily grasped or caught hold of by the hands for pulling or pushing and guiding.

The interior of the cabinet is divided by a horizontal partition 15, into two compartments, one above the other, and the upper one being much the larger for in it is to be placed the food articles that require to be kept warm such as meats and vegetables, as well as plates. And all these call for greater space than articles such as salads and desserts that it may be desired to serve cold and which call for less room or space. The upper or hot chamber, as I shall term it, extends from the top of the cabinet to the horizontal partition, and the lower or cold chamber extends from the partition to the bottom of the cabinet and thus with one chamber above the other and utilizing all the space from top to bottom, the cabinet is compact vertically, as well as laterally and yet of ample capacity so that it is sufficiently compact for pushing under the dining table and is not unwieldy or bulky so that it may readily be moved about in the confined space of a modern apartment and avoids the unsightly appearance of a large bulky cabinet.

The door 11, is the door for the hot chamber and the door 12, is the door for the cold chamber, and each door, on what is its inner face when closed, is covered with insulation so that as the stationary walls of each chamber are likewise insulated, there is complete insulation of each chamber from the outside, and as well, the insulation of one chamber from the other, since the insulation is applied to both the top and the bottom of the horizontal partition. The insulation in each case may be in the form of a wall 16, of cork or other insulating material. The meeting edges of door and insulating wall are, as shown, bevel or wedge form, in order to most effectively seal or close the joint, where door and insulation wall edges come in contact.

To give and maintain the desired high temperature of the hot chamber, it has within the walls of insulation and snugly fitting therein and conforming to such walls, a container 17 for hot water, which is a box-like structure with hollow walls at top, bottom, ends and back and which is readily removable and replaceable for the purpose of filling with hot water and draining it of the cooled water. In the top at the front edge, the hollow wall is provided with a filling hole 18, closed by a screw cap which may be readily removed and replaced and in one of the end walls near the bottom, there is a similar hole 19, closed by a removable and replaceable screw cap 20, for emptying or draining out the water contents. The screw cap in each case is of a flush construction so that there will be no protrusion beyond the plane of the outer surface of the hollow wall. As a matter of convenient construction, the screw cap or plug may be dished and within it pivoted a handle that may be swung out in a position to be grasped for turning and swung down into the cap.

Supported by ledges welded or otherwise secured to the inner side of the opposite end walls of the hot water holder or container, are two wire shelves 21, situated in the upper part of the hot chamber upon the upper one of which service plates may be placed and articles of food in dishes placed upon the other. These shelves may be readily removed to facilitate taking therefrom the articles resting thereon. And on the bottom hollow wall of the hot water container may be placed a dish containing roast meats or fowl, or vegetables, the space in the lower part of the hot water chamber permitting the ready removal of fairly large bulky articles without the necessity for any sliding tray or shelf.

Near the bottom of the lower or cold chamber is a similar removable wire shelf 22, resting upon ledges at opposite ends of the chamber and such shelf is sufficiently high to enable a shallow tray or pan 23, containing ice, to be placed therein.

Each of the doors when swung to a horizontal position, serves as a convenient shelf or support and to maintain it in that position, each has at one side a foldable or jointed brace 24, pivoted at one end to the edge of the door and at the other end to the outer end wall of the cabinet.

It may be desirable to prevent unintentional or accidental movement of the cabinet upon the casters. For example, a cabinet embodying my invention might be used for picnic purposes and placed in an automobile and while being transported, it would be important to prevent motion of the automobile resulting in shifting about of the cabinet. Accordingly, I provide simple means to lock one or more of the casters from turning. Such means comprise several holes 25, in the caster sides and a single hole 26, through the caster pivoting leg, or bracket 27, and a pin 28, which may be thrust through holes in caster wheel and leg or bracket when in alinement. Preferably the holes are bored to slant downward so that when the pin is thrust therein, it will not only not be in danger of falling out, but will tend to remain by gravity in locking position.

Preferably a small funnel will be provided to facilitate filling the hollow walls of the hot water container. Such funnel as well as the locking pins when not in use, may be placed in the ice tray or pan when it is not in use.

The ice tray or pan may hold either cracked ice or dry ice. And as there may be times, as when a hot dessert is to be served, to keep the lower chamber warm or hot, such lower chamber is preferably provided with a hollow-wall box similar to that in the case of the upper chamber and which may be supplied with hot water when the lower chamber contents are to be kept warm or hot and at other times no hot water is placed therein. The hollow wall box is shown at 170, Fig. 1.

It will be seen that with the cabinet embodying my invention food when cooked is transferred directly from the stove to the cabinet and other foods prepared ready for service directly placed therein, all in suitable dishes or containers and the cabinet being trundled to the table, the food is distributed or passed to the diners or guests, the used utensils being immediately replaced in the cabinet. There is no occasion for the hostess or any one else rising from or leaving the table or the room for service of the meal, and it is all done without the employment of a maid or domestic. The food after being cooked or prepared and placed in the cabinet can be kept at practically the same temperature for some time so that if the wife or lady of the house is the one who cooked, or prepared the food, she may have time to rest, or to dress before the time for serving the meal arrives. Before the guests arrive, or are seated at the table, the cabinet will already have been placed in position under the table so that its presence in the room is not noticeable and being located for convenient access by the hostess or head of the table, the service of the food may be had without undue attention being taken by the cabinet.

When the hot water container has hollow walls, it may be made of suitable sheet metal, or of other material, such as the well-known heat-resisting glass. When made of sheet metal, it may be desirable to support the walls to prevent their collapse under weight or pressure as by means of blocks 29, which may be solid or hollow, placed at the corners and at intermediate points if desired. (See Fig. 3). And instead of the use of a hot water container, an electric heater may be employed, in the form of a device applied to each of the walls in place of the hollow walls of the box-like structure.

What I claim is:

A portable food cabinet comprising an external casing with plane vertical front, side and back walls and a plane horizontal top, the vertical and horizontal dimensions of such casing being less than the corresponding dimensions of the space below the top of the conventional dining table, whereby the cabinet may freely be slid beneath such table top and retained there without inconvenience to persons sitting at the table, said cabinet containing two food holding chambers, one directly above the other that together reach from bottom to top of the casing and each occupying substantially the entire space horizontally between front, back and side walls of the cabinet and at least one of such chambers having a slidably removable box-like structure with flat hollow water-holding walls, the front being open to give access to articles placed within the container, each chamber having a downwardly opening door hinged at the bottom of the chamber, said doors when closed constituting the vertical front wall of the casing, the inner sides of said doors being plane to afford shelves, means to hold said doors in a horizontal position when open, the doors when open to a horizontal position being situated one above the other, both doors being accessible for opening and closing while the cabinet is in place beneath the dining table top and without requiring any substantial shifting of the position of the cabinet in the space below the dining table top, and means for insulating the chambers from one another and insulating the chambers from the exterior.

MABEL NIXON ROBERTSON.